(12) United States Patent
Tateyama et al.

(10) Patent No.: US 6,267,344 B1
(45) Date of Patent: Jul. 31, 2001

(54) VEHICLE SEAT WITH SUSPENSION MECHANISM

(75) Inventors: Hiroyuki Tateyama, Kariya; Kazuhiko Hayashi, Toyota; Hiroshi Ishiguro, Toyota; Wataru Hamamura, Toyota, all of (JP)

(73) Assignee: Araco Kabushiki Kaisha, Aichi-Ken (JP)

( * ) Notice: Subject to any disclaimer, the term of this patent is extended or adjusted under 35 U.S.C. 154(b) by 0 days.

(21) Appl. No.: 09/207,414

(22) Filed: Dec. 8, 1998

(51) Int. Cl.⁷ .......................... F16M 13/00; F16M 11/00
(52) U.S. Cl. .............................. 248/421; 248/157
(58) Field of Search ..................... 248/421, 157

(56) References Cited

U.S. PATENT DOCUMENTS

| | | |
|---|---|---|
| 3,774,963 | 11/1973 | Lowe . |
| 4,589,621 * | 5/1986 | Hunt et al. ........................ 248/421 |
| 4,880,201 * | 11/1989 | Hall et al. ........................ 248/421 |
| 5,005,894 * | 4/1991 | Nagata ............................. 248/421 |
| 5,011,109 | 4/1991 | Nagata . |
| 5,222,709 * | 6/1993 | Culley, Jr. et al. ............... 248/421 |
| 5,364,060 * | 11/1994 | Donovan et al. ................. 248/421 |

FOREIGN PATENT DOCUMENTS

| | | |
|---|---|---|
| 0 319 177 | 6/1989 | (EP) . |
| 1 519 987 | 8/1978 | (GB) . |
| 5-228039 | 9/1993 | (JP) . |
| 7-242140 | 9/1995 | (JP) . |
| 7-266955 | 10/1995 | (JP) . |
| 8-253065A | 10/1996 | (JP) . |
| 8-253066 | 10/1996 | (JP) . |
| 9-123817 | 5/1997 | (JP) . |
| 9-150659 | 6/1997 | (JP) . |
| 9-150660 | 6/1997 | (JP) . |
| 9-290672 | 11/1997 | (JP) . |
| 9-328028 | 12/1997 | (JP) . |

* cited by examiner

Primary Examiner—Ramon O. Ramirez
Assistant Examiner—J. DeLuca
(74) Attorney, Agent, or Firm—Reed Smith Hazel & Thomas LLP

(57) ABSTRACT

A vehicle seat provided with a seat cushion the support frame of which is supported by a suspension mechanism, wherein the suspension mechanism includes a torsion bar spring loaded to resiliently support the support frame of the seat cushion, and wherein a spring adjustment mechanism is assembled with the suspension mechanism for adjusting the resilient force of the torsion bar spring.

2 Claims, 20 Drawing Sheets

VEHICLE SEAT WITH SUSPENSION MECHANISM

BACKGROUND OF THE INVENTION

1. Field of the Invention

The present invention relates to a vehicle seat, and more particularly to a vehicle seat with a suspension mechanism for support of a cushion frame and an adjustment mechanism for adjusting a resilient force of the suspension mechanism.

2. Discussion of the Prior Art

Disclosed in Japanese Patent Laid-open Publication No. S-228039 is a vehicle seat equipped with a suspension mechanism of the type which includes a torsion bar spring assembled for support of a cushion frame. In the vehicle seat, it is desirable that a resilient force of the suspension mechanism can be adjusted in accordance with a difference in weight of a passenger seated on a seat cushion to enhance a seating comfort of the vehicle seat. In adjustment of the suspension mechanism, however, a reaction force of the torsion bar spring against a load applied thereto is adjusted only in a limited extent. For this reason, a deflection amount of the suspension mechanism is limited as shown by a dotted curve A in FIG. 18. This deteriorates the seating comfort of the vehicle seat and causes a bottomed feel on the seat cushion.

SUMMARY OF THE INVENTION

It is, therefore, a primary object of the present invention to provide a vehicle seat equipped with a suspension mechanism the resilient force of which can be adjusted in according with a difference in weight of a passenger seated on a seat cushion.

A secondary object of the present invention is to provide a vehicle seat equipped with a suspension mechanism in which a set of torsion bar springs is associated with a tension spring to solve the problem in adjustment of the suspension mechanism discussed above.

According to the present invention, the primary object is accomplished by providing a vehicle seat provided with a seat cushion the support frame of which is supported by a suspension mechanism, wherein the suspension mechanism include a torsion bar spring loaded to resiliently support the support frame of the seat cushion, and wherein a spring adjustment mechanism is assembled with the suspension mechanism for adjusting the resilient force of the torsion bar spring.

In a practical embodiment of the present invention, the spring adjustment mechanism includes a movable bracket pivotally mounted on a support structure placed on a floor of a vehicle compartment for pivoting in a vertical direction and an adjustment mechanism for adjusting an amount of vertical pivoting of the movable bracket, and wherein the torsion bar spring of the suspension mechanism is supported at its one end on the resiliently support structure to support the support frame of the seat cushion at its other end and is carried by the movable bracket at its intermediate portion.

In the practical embodiment, it is preferable that the spring adjustment mechanism includes an operation arm pivotally mounted on the support structure for pivoting in a vertical direction and being connected with the movable bracket to caused vertical pivoting of the movable bracket when rotated in the vertical direction, an operation shaft supported from the support frame of the seat cushion to be rotated by operation of a handle fixed to its outer end, a movable member mounted on the operation shaft to be moved forward or backward by rotation of the operation shaft, a swing arm pivoted at its intermediate portion to the support frame of the seat cushion and connected at its one end to the movable member, and an operation wire connected at its one end to the other end of the swing arm and at its other end to the operation arm.

BRIEF DESCRIPTION OF THE DRAWINGS

Other objects, features and advantages of the present invention will be more readily appreciated from the following detailed description of preferred embodiments thereof when taken together with the accompanying drawings, in which.

DESCRIPTION OF THE PREFERRED EMBODIMENTS

Figure 1:
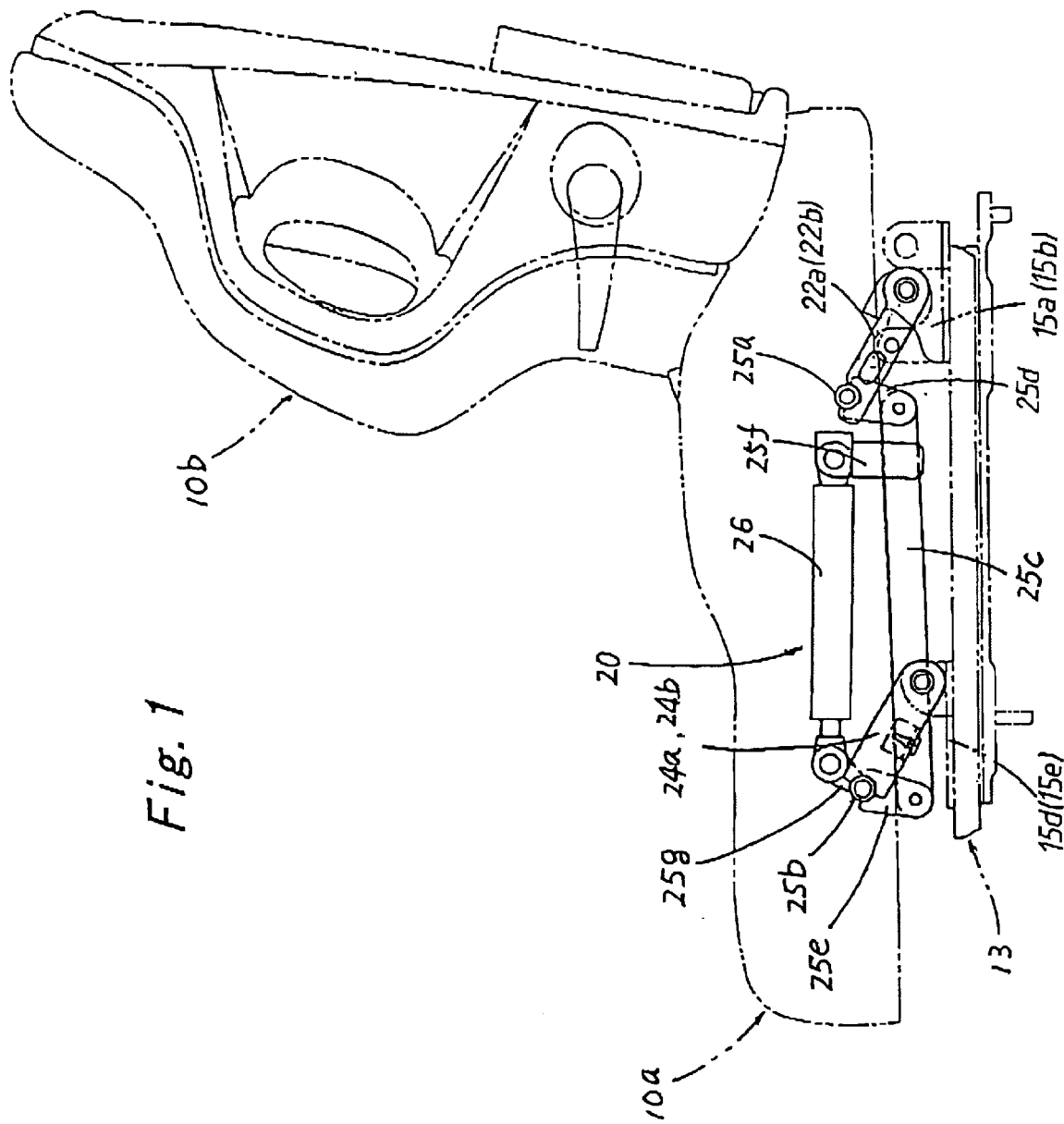
FIG. 1 is a side view of a vehicle seat equipped with a suspension mechanism in accordance with the present invention, illustrated in an unloaded condition of a seat cushion.
Figure 3:
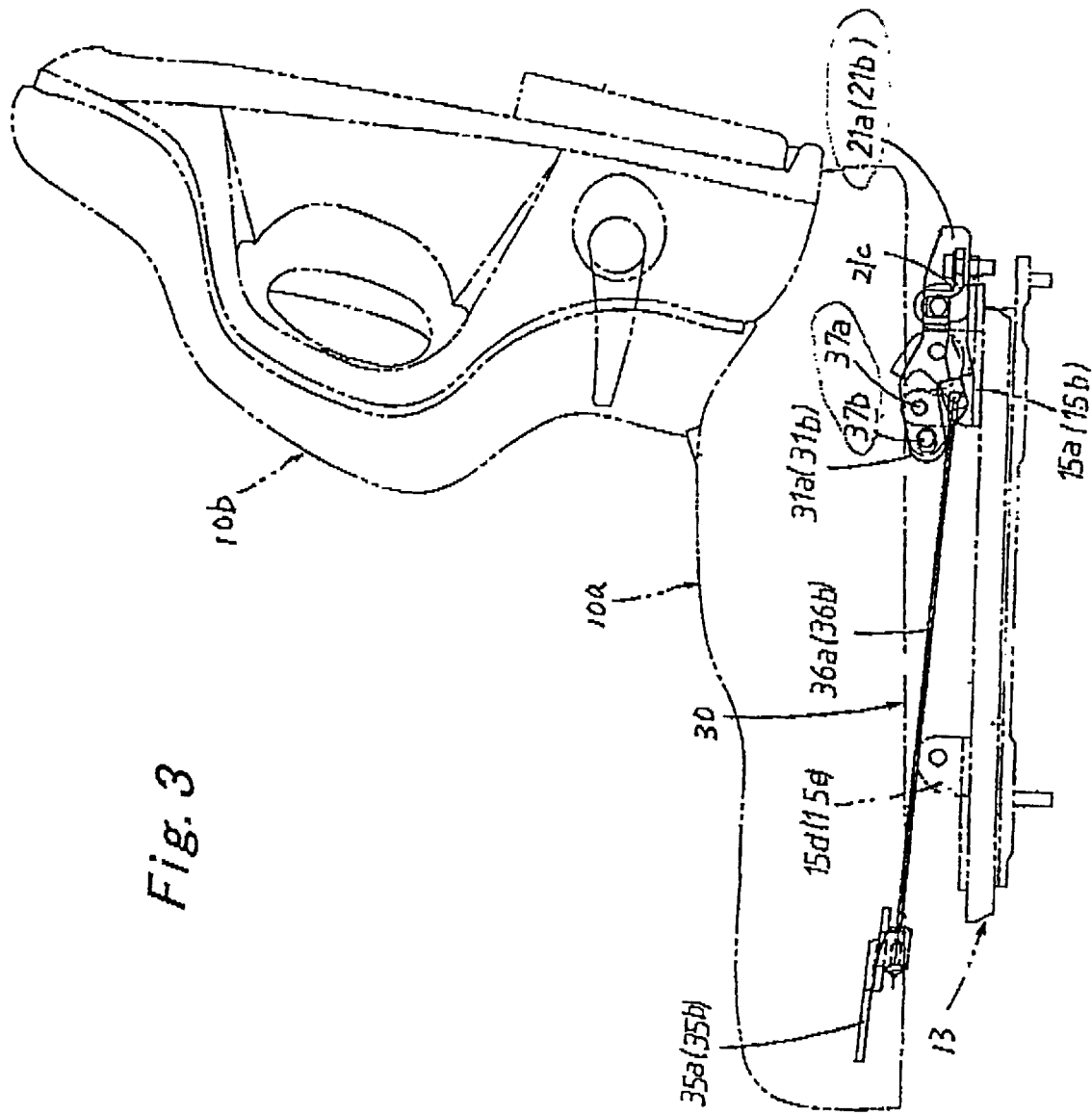
FIG. 3 is a side view of a spring adjustment mechanism for the suspension mechanism.
Figure 4:
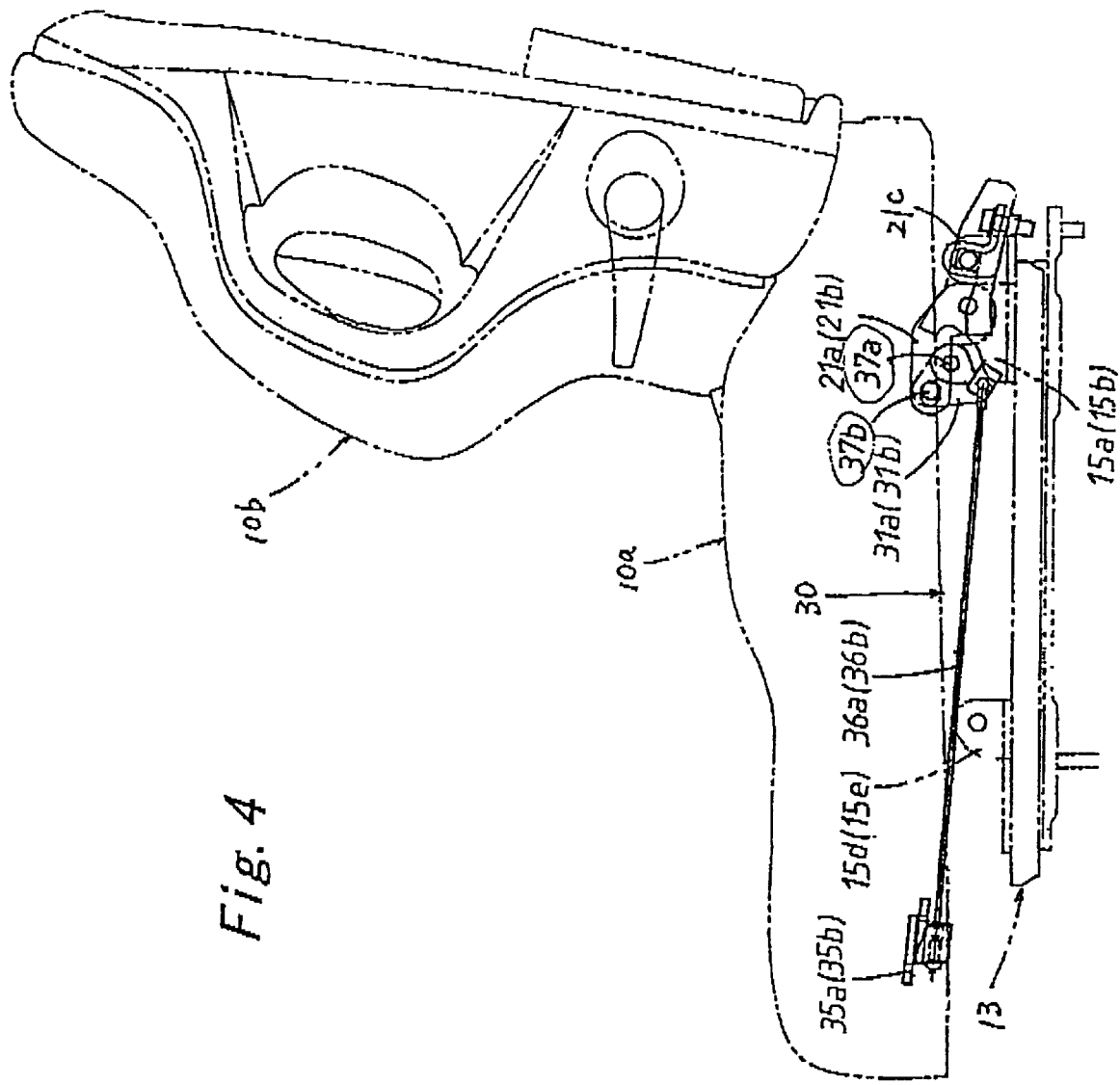
FIG. 4 is a side view of the spring adjustment mechanism, illustrated in a condition where the resilient force of the suspension mechanism has been increased.
Figure 5:
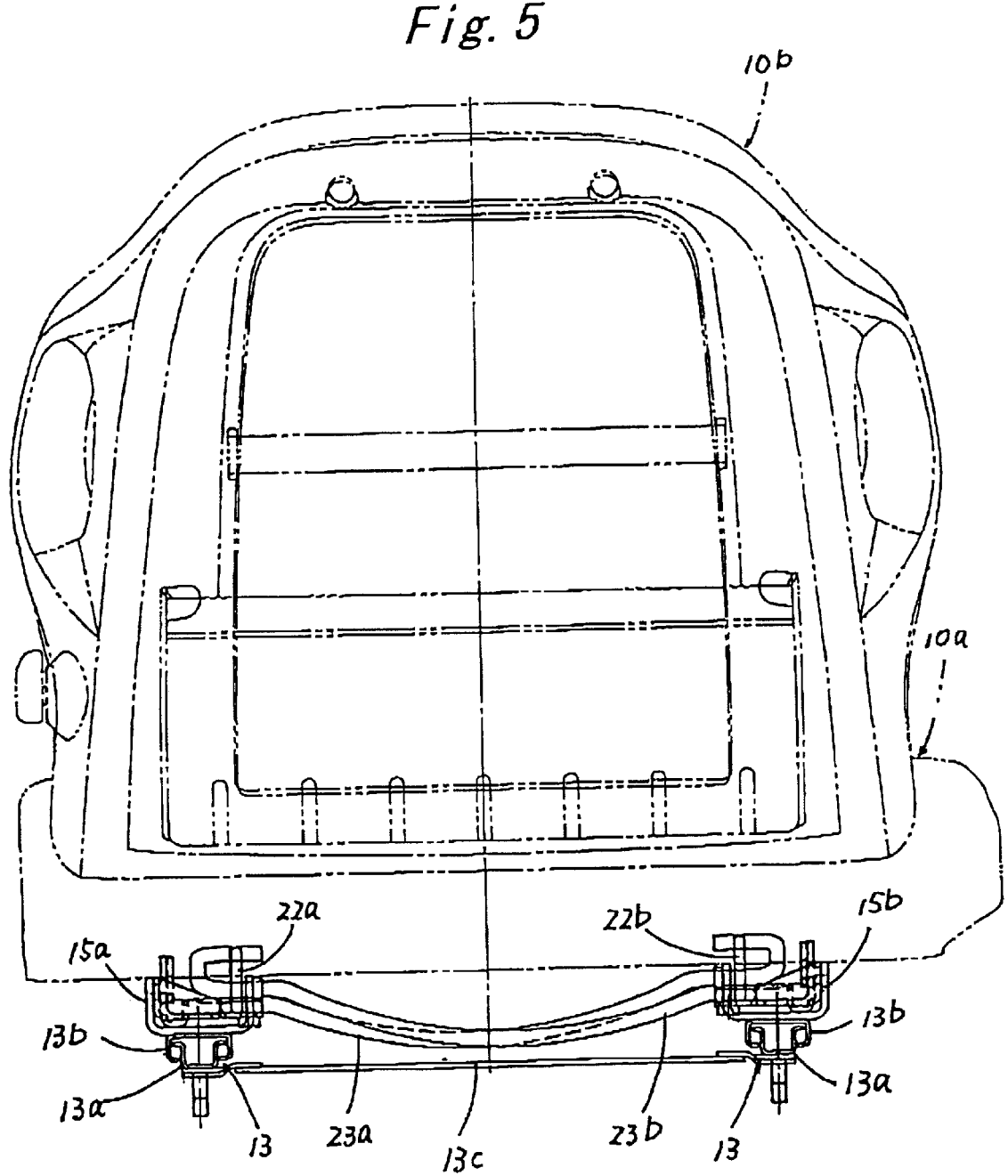
FIG. 5 is a rear view of the suspension mechanism shown in FIG. 3.

Illustrated in FIG. 1 of the drawings is a vehicle seat composed of a seat cushion 10a and backrest 10b. As shown in FIGS. 1 and 3, the vehicle seat is quipped with a suspension mechanism 20 and a spring adjustment mechanism 30. In the following description, the same reference numerals designate the same component parts and portions of the vehicle seat.

Figure 7:
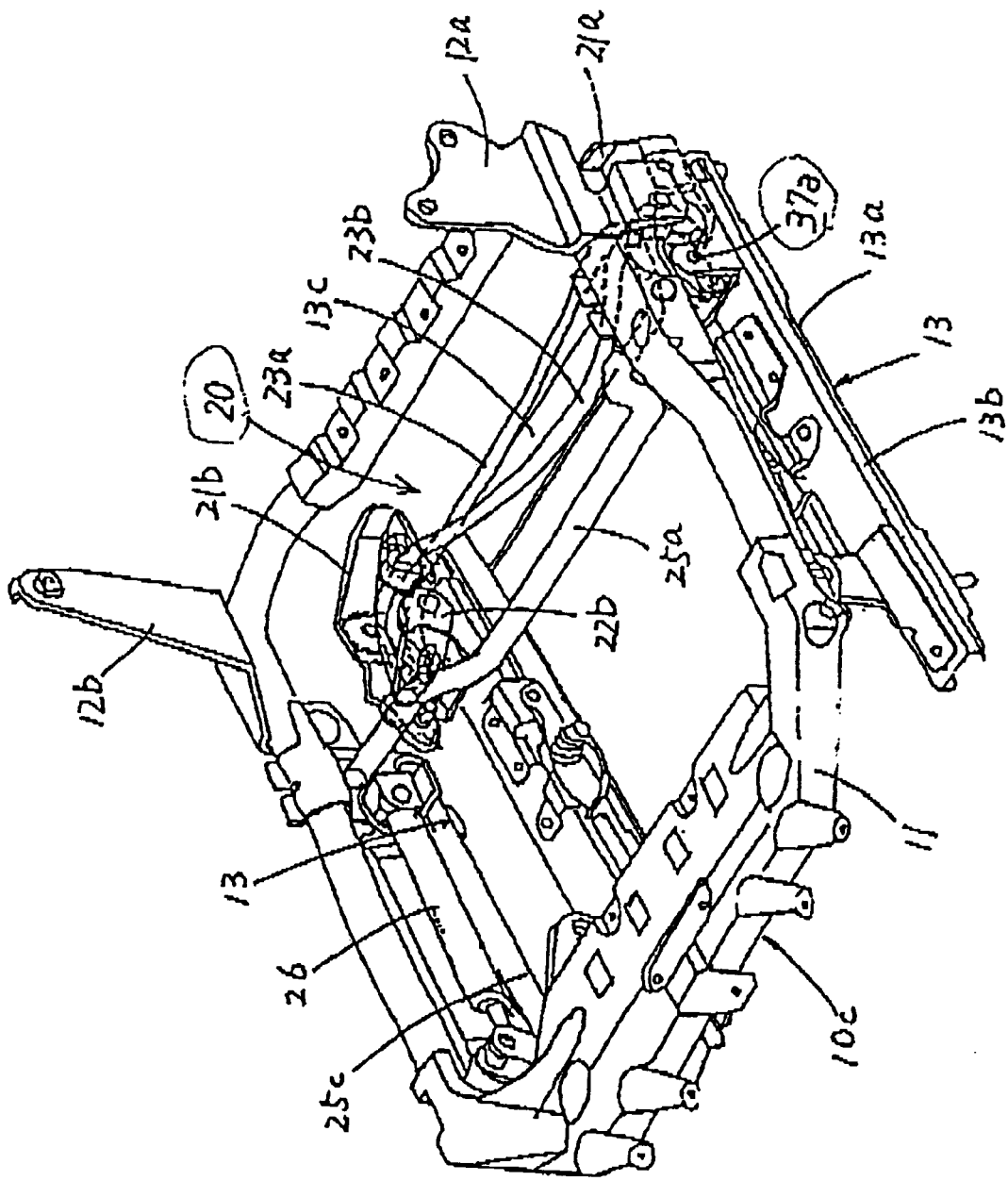
FIG. 7 is a perspective view of a cushion frame of the vehicle seat supported on the suspension mechanism shown in FIG. 1.

The backrest 10b is integrally formed with a headrest and is assembled at its lower end with a rear portion of a support frame 10c of the seat cushion 10a shown in FIG. 7 to be retained in an upright position behind the seat cushion 10a. As shown in FIG. 7, the cushion frame 10c is in the form of a rectangular frame structure 11 which is integrally provided at its rear end with a pair of upright brackets 12a and 12b to be assembled with a frame structure of the backrest 10b. The cushion frame 10c is mounted on a pair of parallel seat tracks 13 through the suspension mechanism 20.

Figure 8:
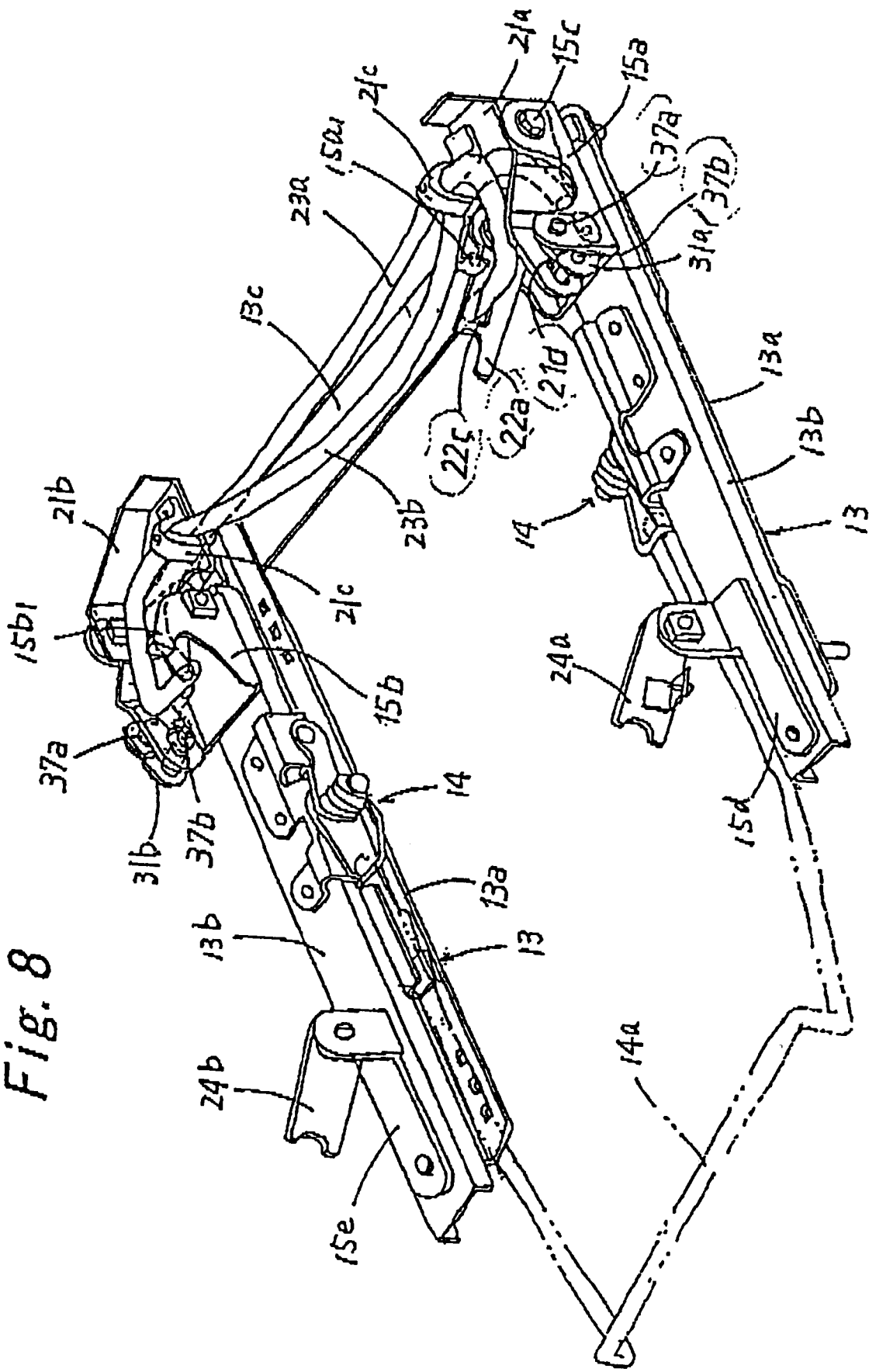
FIG. 8 is a perspective view of a pair of seat tracks of the vehicle seat and a portion of the suspension mechanism.

As shown in FIG. 8, the pair of seat tracks 13 each are composed of a lower rail 13a and an upper rail 13b. The lower rails 13a are mounted in parallel on a floor of a vehicle compartment in a fore-and-aft direction. The upper rails 13b are slidably coupled with the lower rails 13a and locked to the lower rails 13a in a desired position by means of a pair of locking mechanisms 14. The locking mechanisms 14 each are constructed to release the upper rails 13b from the lower rails 13a by operation of a release lever 14a illustrated by imaginary lines in the figure. In a condition where the locking mechanisms 14 have been released by operation of the release lever 14a, the upper rails 13a can be moved along the lower rails 13b for adjustment of the seating position of the vehicle seat.

In the seat tracks 13, a lateral support plate 13c is secured at its opposite ends to the lower rails 13a to retain the seat tracks 13 in place against inward reaction forces of torsion bar springs 23a and 23b of the suspension mechanism 20. As shown in FIGS. 1, 2, 7 and 8, the suspension mechanism 20 includes a pair of movable brackets 21a, 21b, a pair of rear link members 22a, 22b, the pair of torsion bar springs 23a, 23b, a pair of front link members 24a, 24b, a pair of connecting rods 25a, 25b and a shock absorber 26.

As shown in FIG. 8, a pair of base brackets 15a, 15b are fixedly mounted on each rear end of the upper rails 13b. The movable brackets 21a, 21b are supported on the base brackets 15a, 15b respectively by means of a support pin 15c and pivotally movable in a vertical direction. The rear link members 22a, 22b are supported on the base brackets 15a, 15b at their rear ends and pivotally movable in a vertical direction. As shown in FIGS. 7 and 8, the torsion bar springs 23a, 23b each are formed at their one ends with a hooked portion and bent in an L-shape at their other ends. The bent portions of the torsion bar springs 23a, 23b are fixed to the base brackets 15a, 15b respectively, and the hooked portions of the torsion bar springs 23a, 23b are engaged with each elongated hole 22c formed in the rear link members 22a, 22b. the torsion bar springs 23a, 23b are carried by clamps 21c fixed to the movable brackets 21a, 21b. The rear link members 22a, 22b are loaded upward by the torsion bar springs 23a, 23b engaged therewith.

As shown in FIG. 7, the rear connecting rod 25a is engaged with the front ends of rear link members 22a, 22b for connecting the rear link members 22a, 22b to one another. The connecting rod 25a is connected at its opposite ends to the support frame 10c of seat cushion 10a. The rotating extent of each of the rear link members 22a, 22b is restricted by engagement with upright flanges 16a1, 15b1 of the base brackets 15a, 15b shown in FIG. 8.

The front link members 24a, 24b each are rotatably supported on upright flanges of base brackets 15d, 15e fixedly mounted on the upper rails 13b of seat tracks 13. As shown in FIG. 1, the front link members 24a, 24b are connected to one another by means of a front connecting rod 25b fixedly coupled with the front ends thereof. The front connecting rod 25b is connected at its opposite ends to the support frame 10c of seat cushion 10a and interconnected with the rear connecting rod 25a by means of a pair of connecting members 25c and each pair of connecting arms 25d, 25e. A pair of support brackets 25f are fixed to the rear end portions of connecting members 25c. The shock absorber 26 is connected at its rear end to the support bracket 25f and connected at its front end to the front connecting rod 25b by means of a connecting arm 25g.

Figure 6:
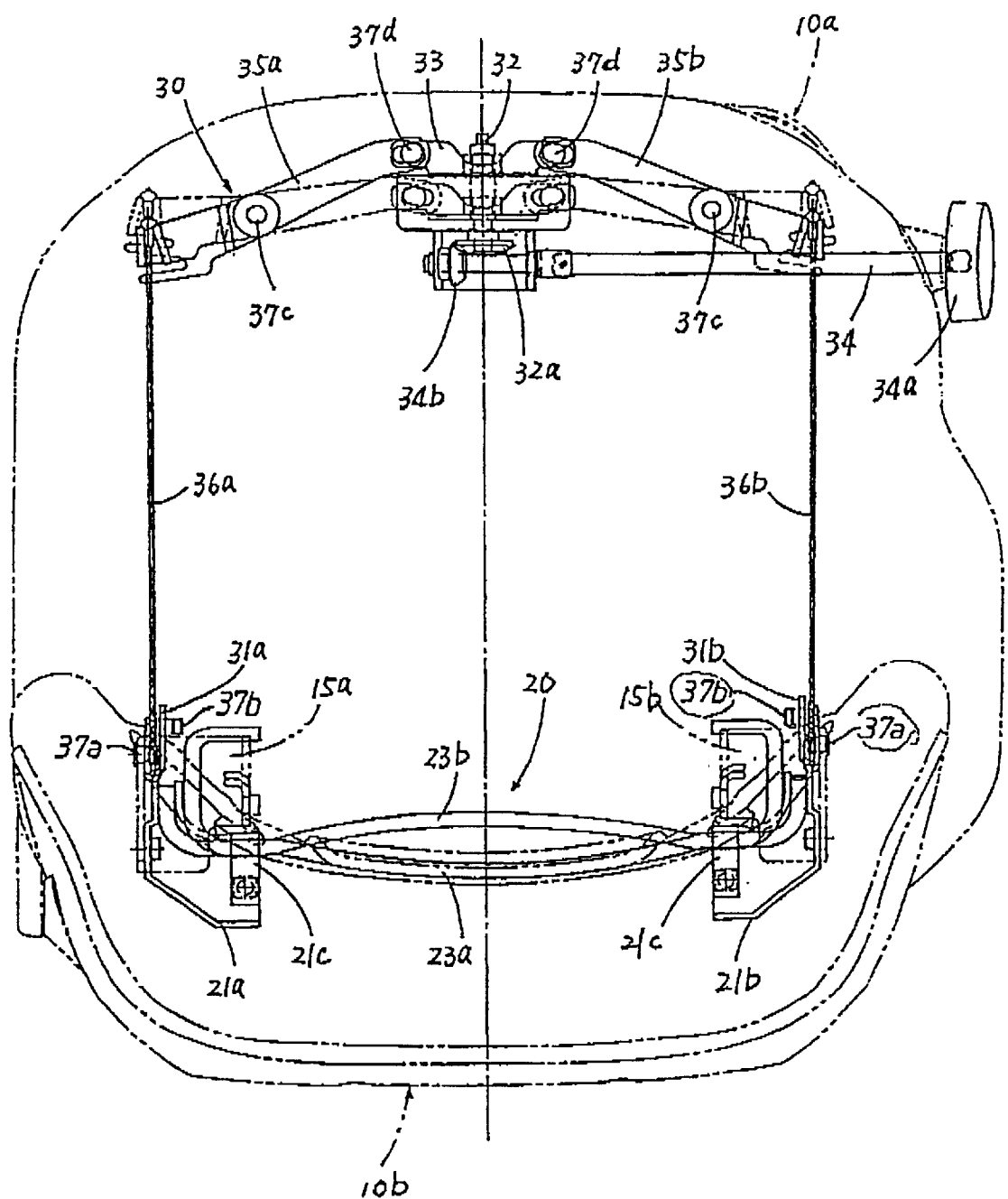
FIG. 6 is a plan view of the spring adjustment mechanism illustrated in relation to the suspension mechanism.

As shown in FIGS. 3, 6 and 8, the spring adjustment mechanism 30 includes a pair of operation arms 31a, 31b, a rotary shaft 32, a movable member 33, an operation shaft 34, a pair of swing arms 35a, 35b, and a pair of operation wires 35a, 36b. The operation arms 31a, 31b, swing arms 35a, 35b and operation wires 36a, 36b are located under the cushion frame 10c and arranged symmetrically with respect to the rotary shaft 32 and movable member 33. The operation arms 31a, 31b are rotatably supported on the base brackets 15a, 15b respectively by means of a support pin 37a to be moved in a vertical direction and connected to the movable brackets 21a, 21b of the suspension mechanism 20 respectively by means of a connecting pin 37b. As shown in FIG. 8, the connecting pin 37b is fixed to each movable end of the operation arms 31a, 31b and is inserted into an elongated hole 21d respectively formed in the movable brackets 21a, 21b.

As shown in FIG. 6, the rotary shaft 32 is rotatably supported on a front central portion of the cushion frame 10c, and the movable member 33 is mounted on the rotary shaft 32 to be moved by rotation of the rotary shaft 32 in a fore-and-aft direction of the vehicle seat. The operation shaft 34 is rotatably supported on side and central portions of the cushion frame 10c in a lateral direction and extended outwardly from the side portion of cushion frame 10c. The operation shaft 34 is provided with a handle 34a at its outer end and a drive gear 34b at its inner end. The drive gear 34b is meshed with a driven gear 32a mounted on the rotary shaft 32 for rotation therewith.

The swing arms 35a, 35b each are pivoted to the bottom of cushion frame 10c at their intermediate portions by means of a support pin 37c and pivoted to the opposite ends of movable member 33 at their inner ends by means of a connecting pin 37d. The operation wires 36a, 36b are connected to the outer ends of swing arms 35a, 35b at their front ends and to the operation arms 31a, 31b at their rear ends.

In the vehicle seat, the resiliency of the suspension mechanism 20 can be adjusted by operation of the spring adjustment mechanism 30 to ensure the seating comfort of the vehicle seat in accordance with a difference in weight of a passenger as will be described hereinafter.

Figure 2:
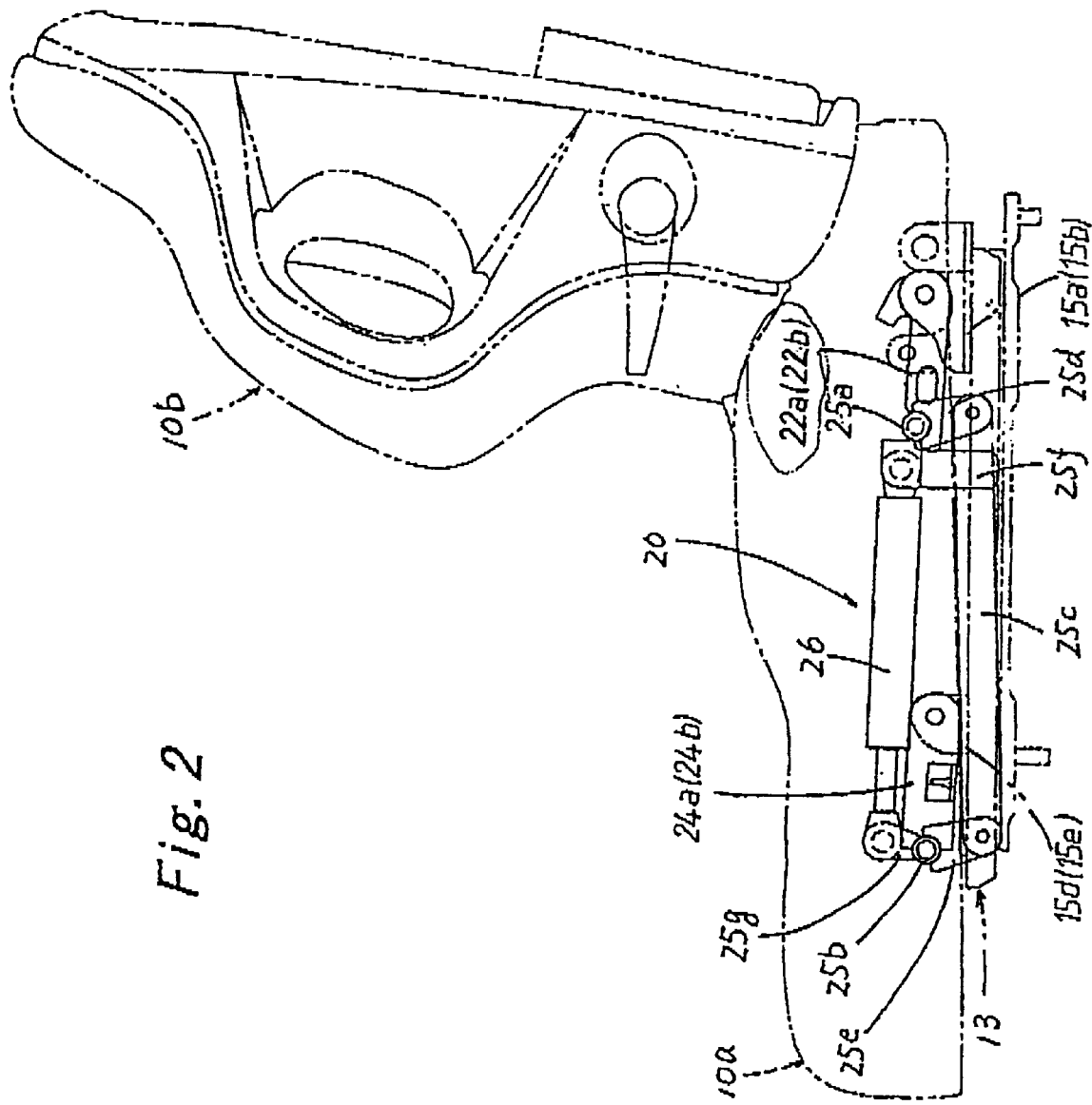
FIG. 2 is a side view of the vehicle seat illustrated in a loaded condition of the seat cushion.

When the seat cushion 10a is in an unloaded condition as shown in FIG. 1, the rear link members 22a, 22b of the suspension mechanism 20 are retained in an upper position under the load of torsion bar springs 23a, 23b, while the front link members 24a, 24b are retained in an upper position to maintain the shock absorber 26 in a contracted condition. When a passenger seated on the seat cushion 10a, the torsion bar springs 23a, 23b of the suspension mechanism 20 are twisted by the load applied thereto from the seat cushion 10a, and the rear link members 22a, 22b and front link members 24a, 24b are rotated downward as shown in FIG. 2. In such as instance, the shock absorber 26 is expanded by forward rotation of the connecting arms 25e and 25g to absorb impact and vibration caused by the load from the seat cushion 10a.

Figure 9:
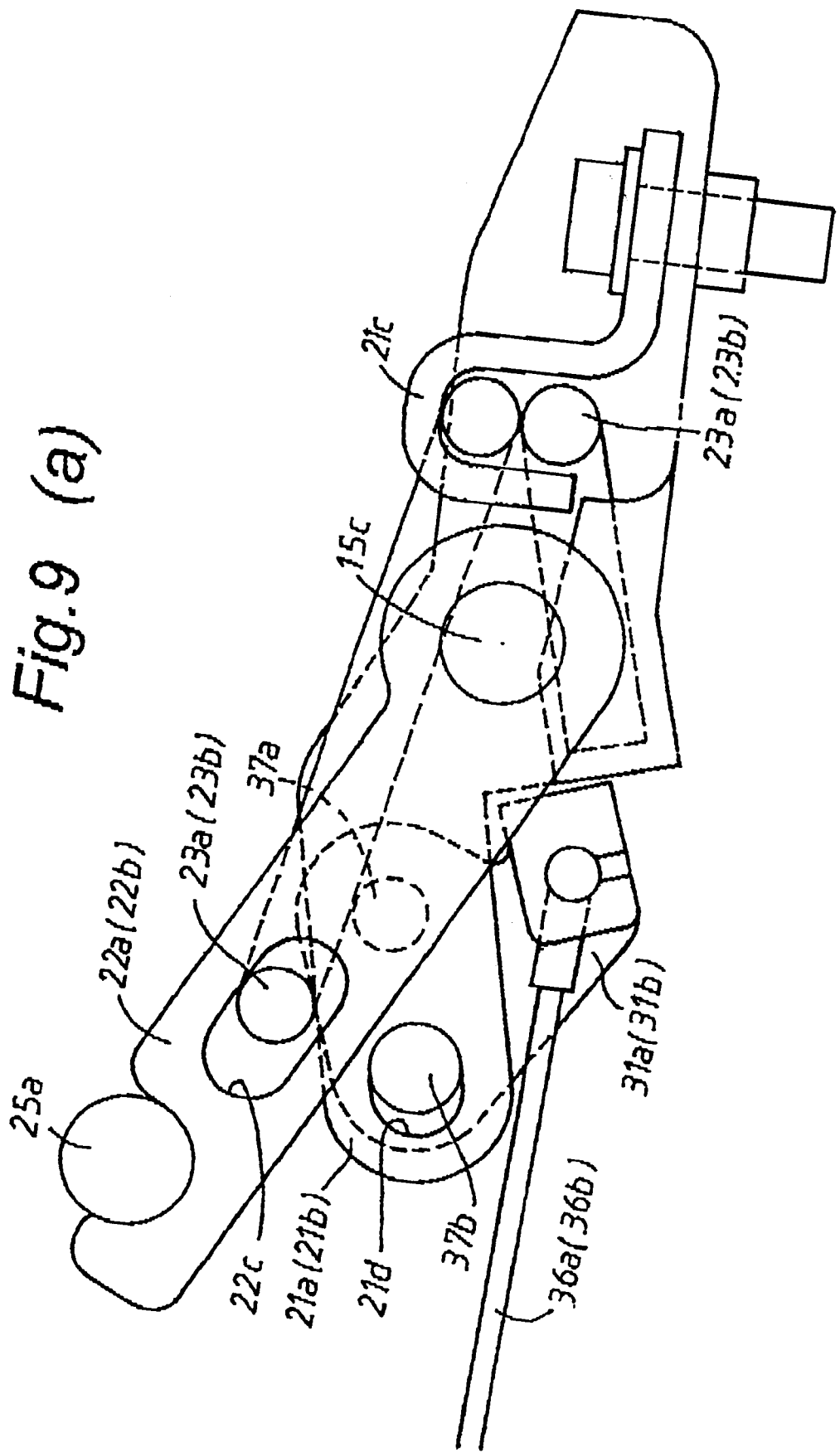
FIGS. 9(a) and 9(b) illustrate a mode of operation of the spring adjustment mechanism shown in FIG. 3.
Figure 9:
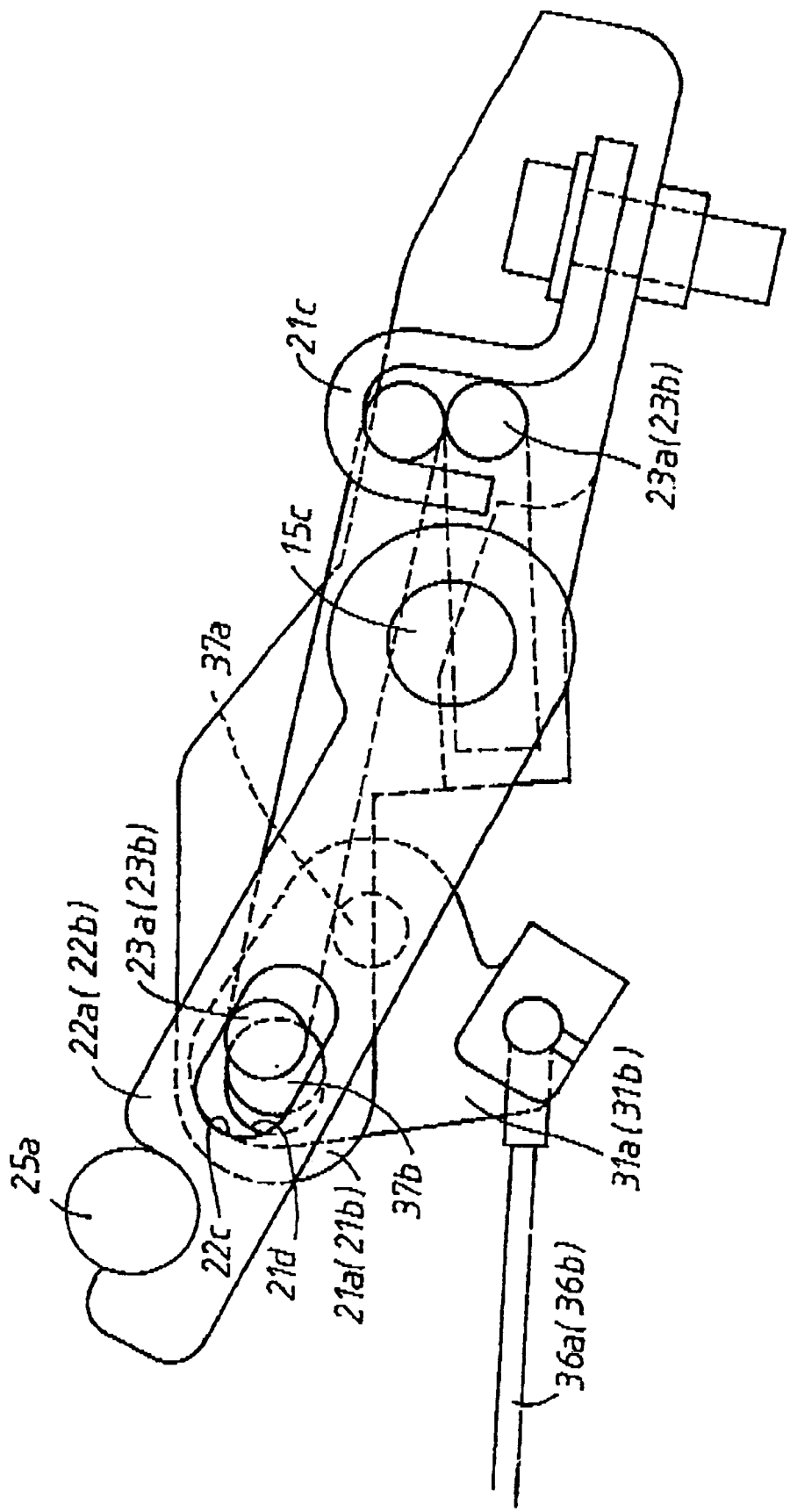

In the suspension mechanism 20, the resilient force of torsion bar springs 23a, 23b can be adjusted by operation of the handle 34a of the spring adjustment mechanism 30. In a condition where the resilient force of torsion bar springs 23a, 23b has been adjusted in a small amount as shown in FIG. 3, the spring adjustment mechanism 30 is maintained in a condition shown by solid lines in FIG. 6. In such a condition, the movable member 33 is positioned at a front end of rotary shaft 32 so that the outer ends of swing arms 35a, 35b are moved rearward to retain the operation arms 31a, 31b in place. Thus, as shown in FIG. 9(a), the movable brackets 21a, 21b are retained in a horizontal condition. When the handle 34a is operated to rotate the operation shaft 34, the driven gear 32a is rotated by rotation of the drive gear 34b to rotate the rotary shaft 32. As a result, the movable member 33 is retracted by rotation of the rotary shaft 32 to move the inner ends of swing arms 35a, 35b rearward about the support pins 37c. Thus, as shown by imaginary lines in FIG. 6, the outer ends of swing arms 35a, 35b are moved forward so that the operation wires 36a, 36b are pulled by the swing arms 35a, 35b to rotate the operation arms 31a, 31b upward about the support pin 37a as shown 9(b) in FIG. 9. As a result, the movable brackets 21a, 21b are moved clockwisely by the operation arms 31a, 31b about the support pin 15c to raise the torsion bar springs 23a, 23b at their clamped portions. Thus, the resilient force of torsion bar springs 23a, 23b applied to the seat cushion 10a is increased in accordance with the upward movement of movable brackets 21a, 21b.

As is understood from the above described, the resilient force of the suspension mechanism can be adjusted by operation of the spring adjustment mechanism in accordance with a difference in weight of a passenger seated on the seat cushion.

Figure 10:
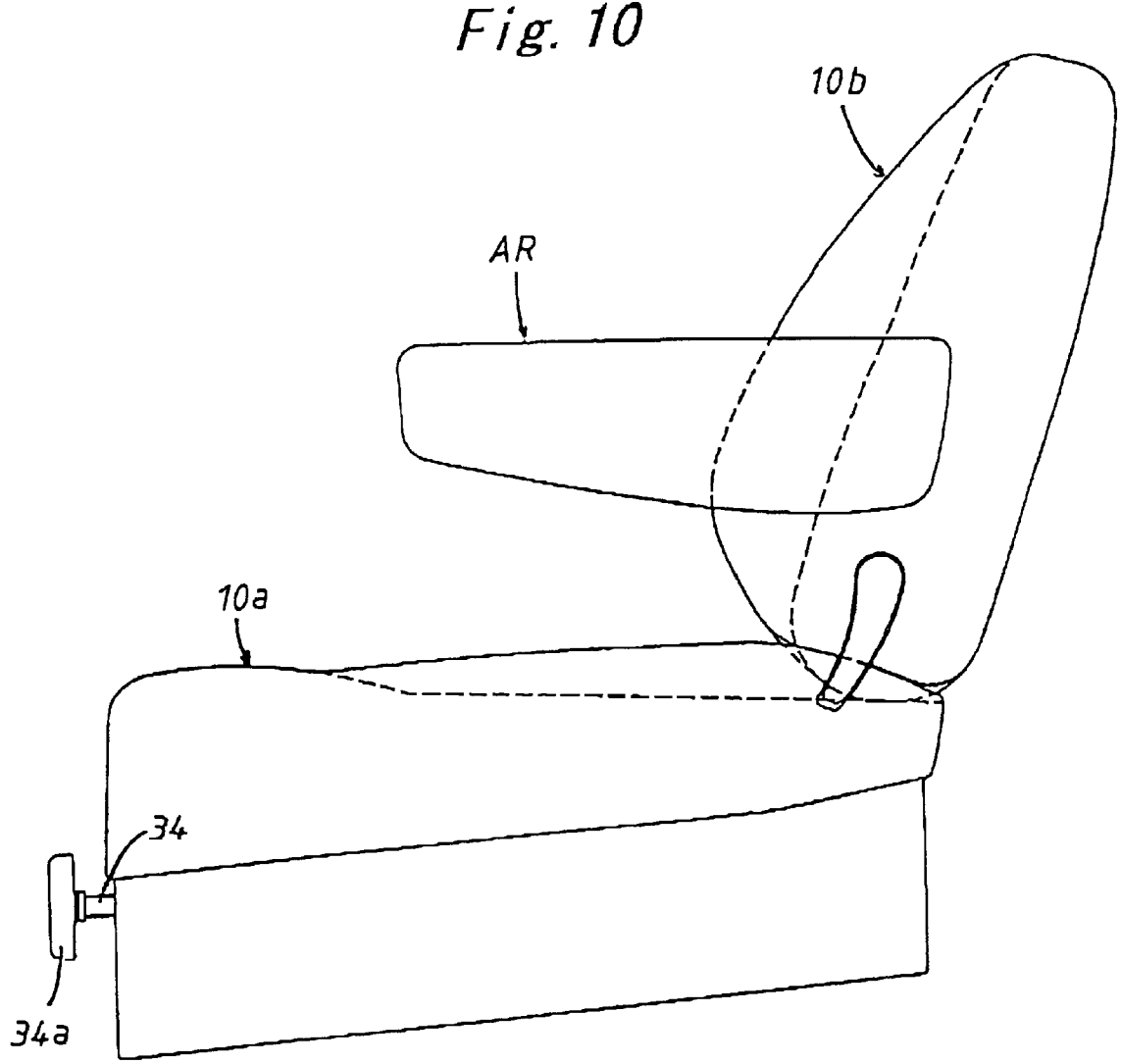
FIG. 10 is a side view of a vehicle seat equipped with a modification of the present invention.
Figure 11:
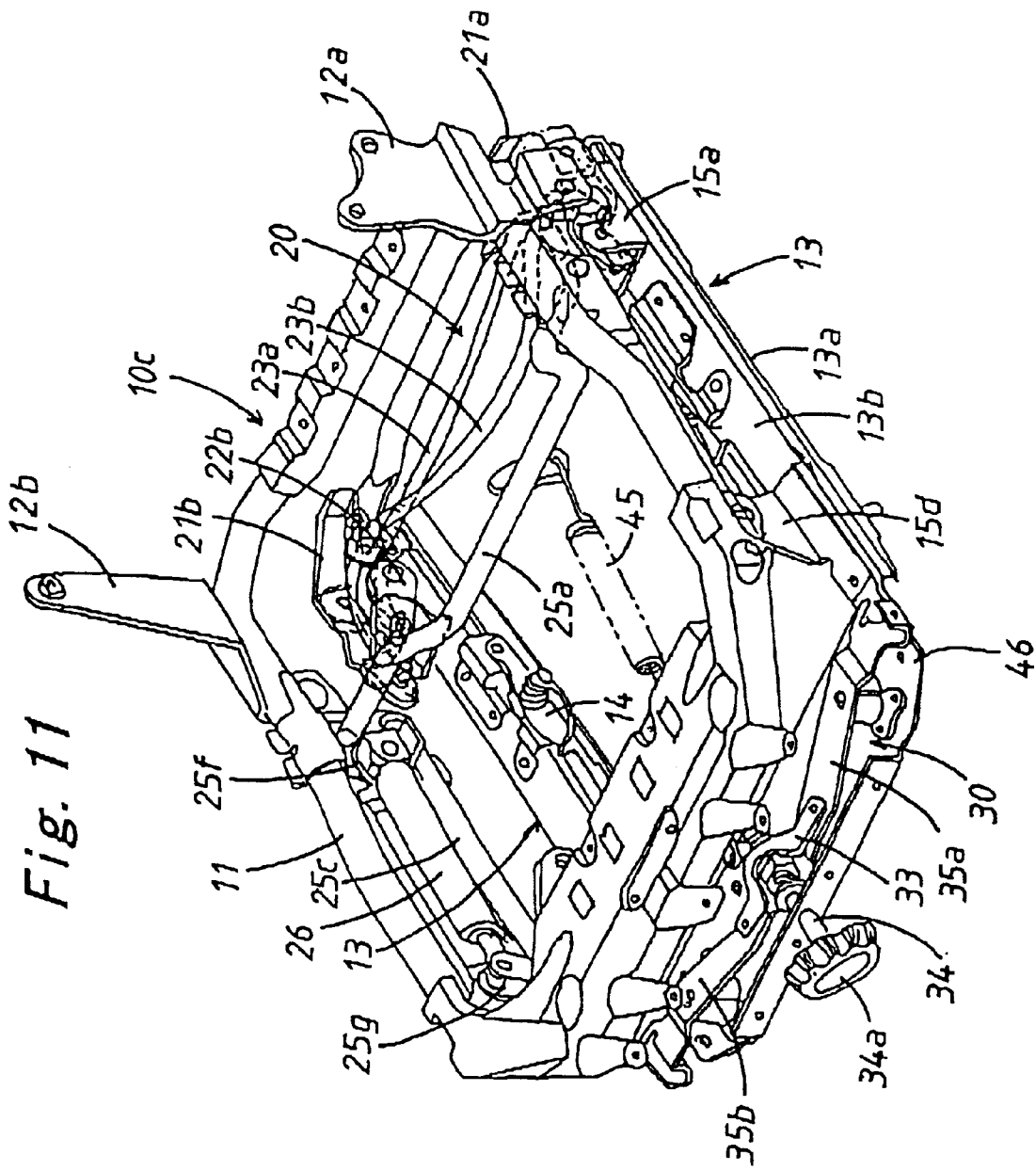
FIG. 11 is a perspective view of a cushion frame of the vehicle seat shown in FIG. 10.

Hereinafter, a modification of the present invention will be described with reference to FIGS. 10 to 17. Illustrated in FIG. 10 is a vehicle seat composed of a seat composed of a seat cushion 10a, a backrest 10b assembled with a rear end of the seat cushion 10a and placed in an upright position, and an armrest AR assembled with one side of the backrest 10b. As shown in FIG. 11, a support frame 10c of the seat cushion 10a is mounted on a pair of seat tracks 13 through a suspension mechanism 20. The vehicle seat is equipped with a spring adjustment mechanism 30 for adjusting the resilient force of the suspension mechanism 20.

Figure 12:
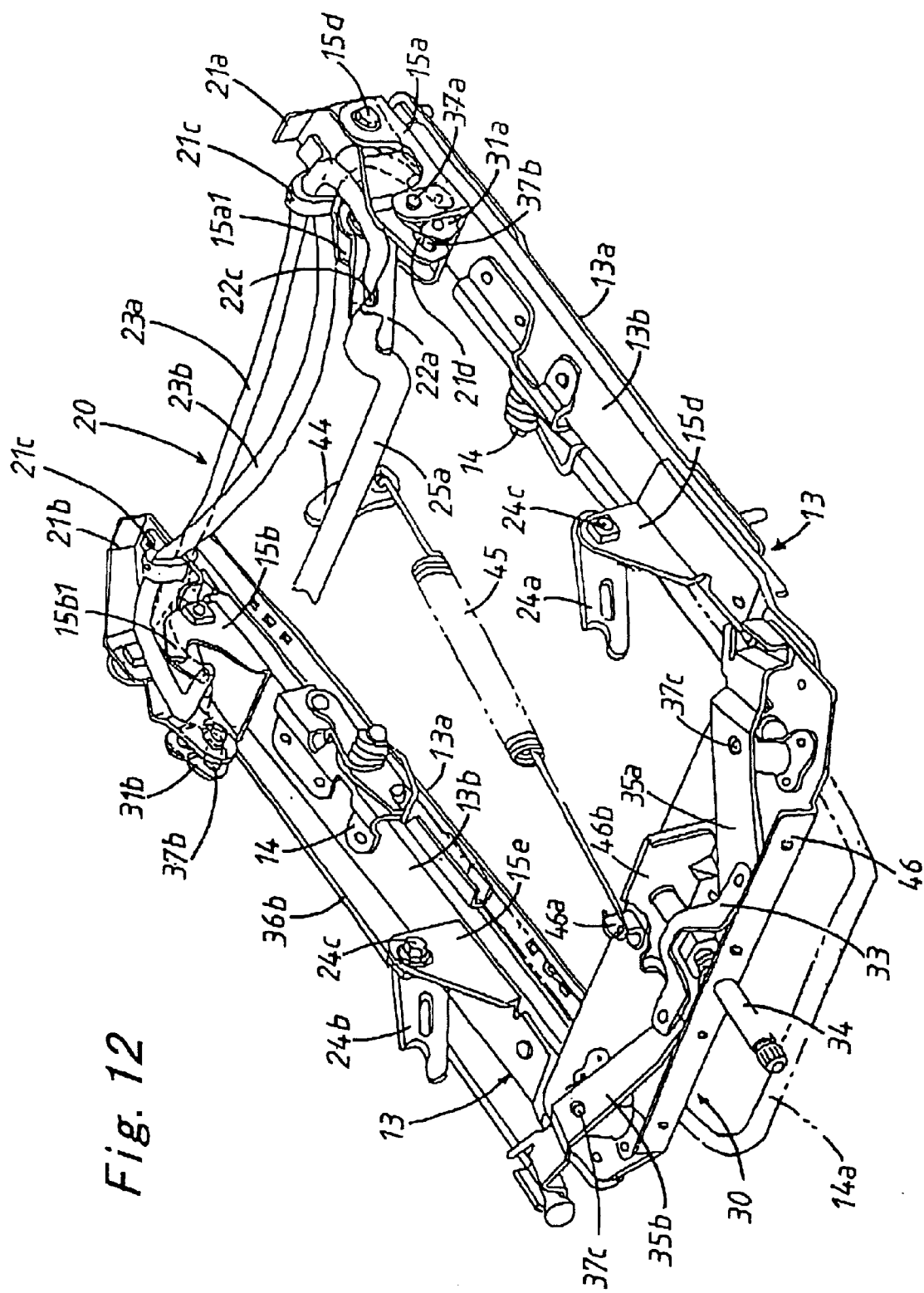
FIG. 12 is a perspective view of a suspension mechanism and a spring adjustment mechanism of the vehicle seat shown in FIG. 10.
Figure 13:
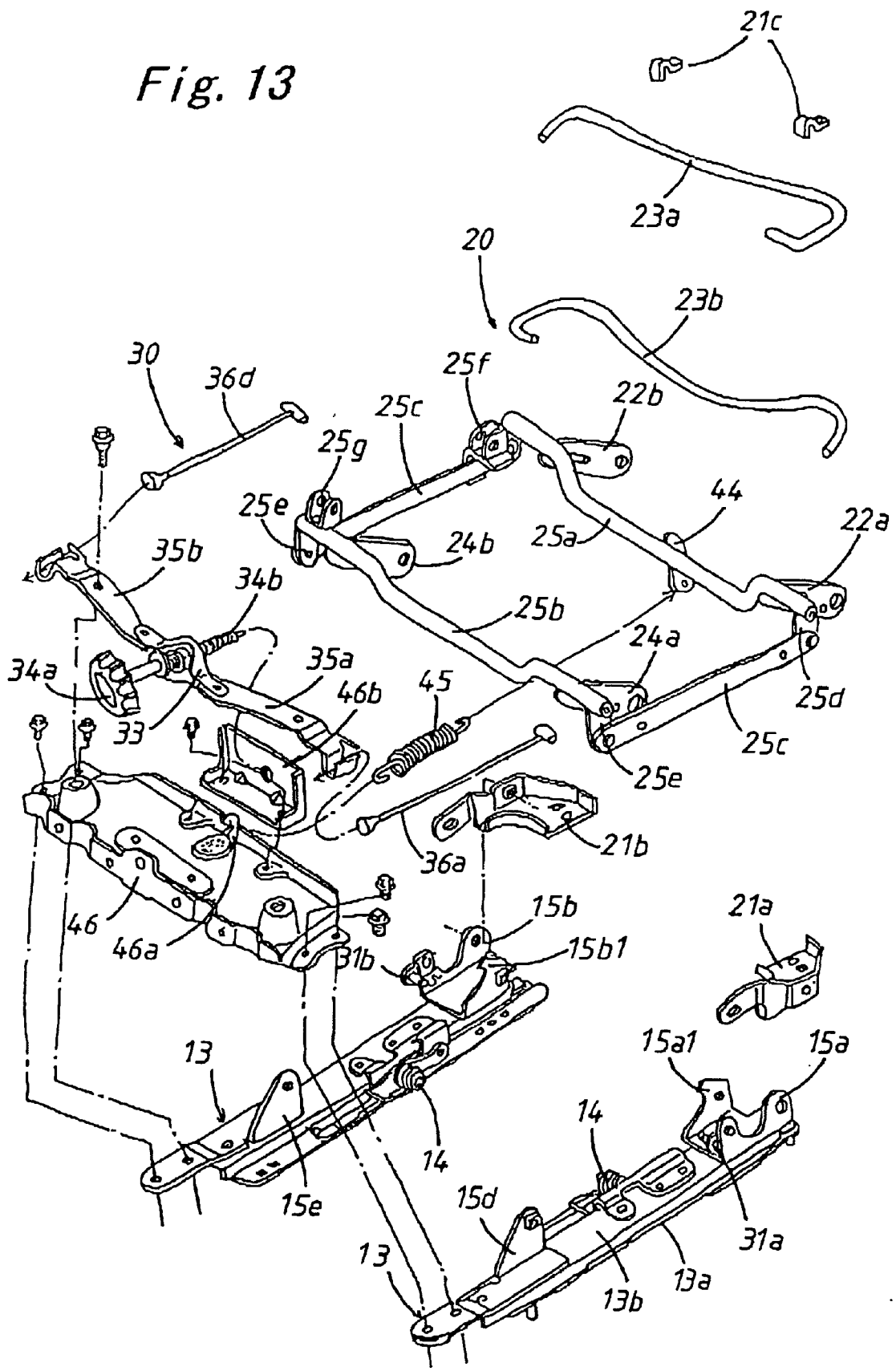
FIG. 13 is a perspective view of component parts of the suspension mechanism and spring adjustment mechanism shown in FIG. 12.
Figure 14:
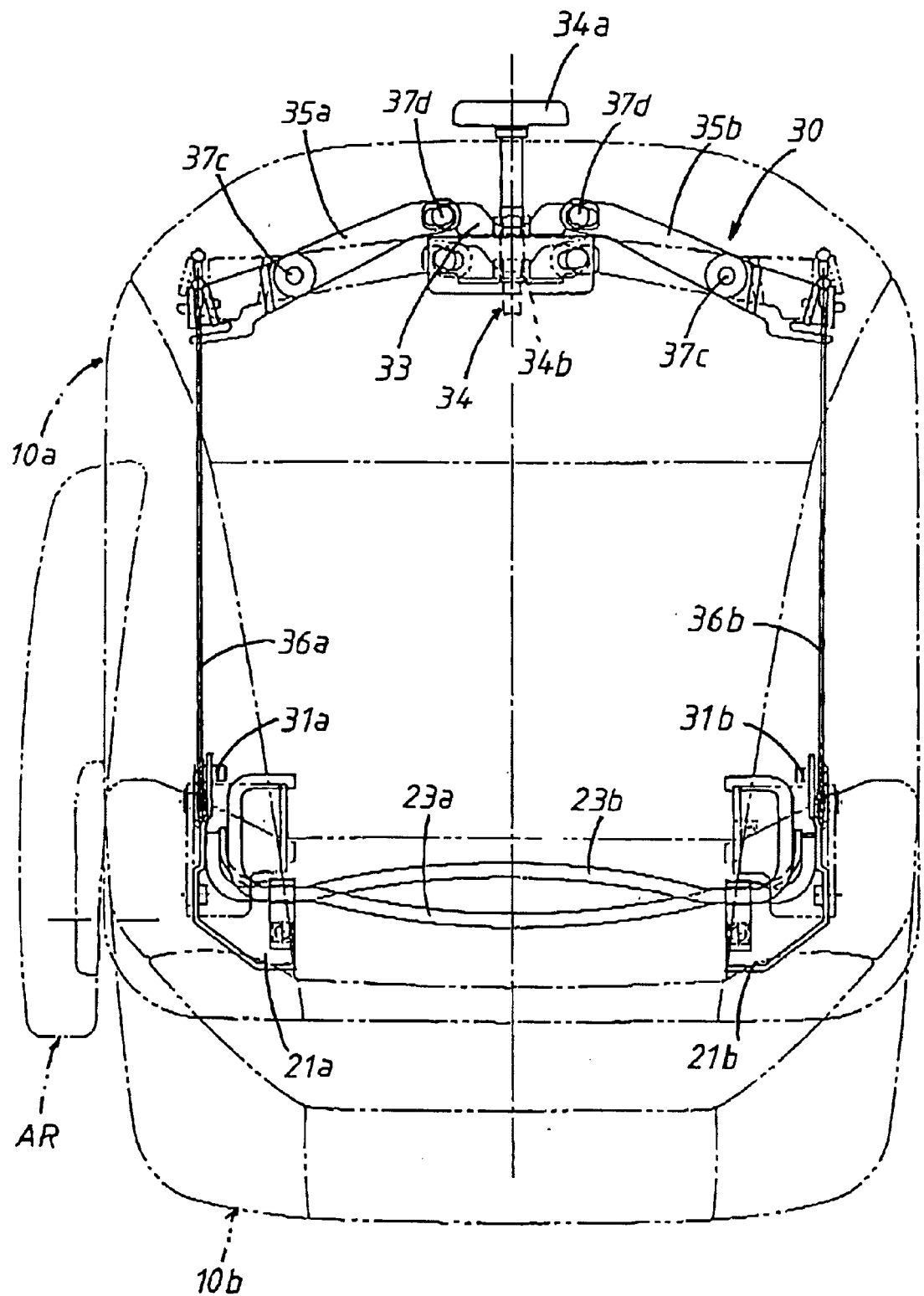
FIG. 14 is a plan view of the spring adjustment mechanism illustrated in relation to the suspension mechanism.
Figure 15:
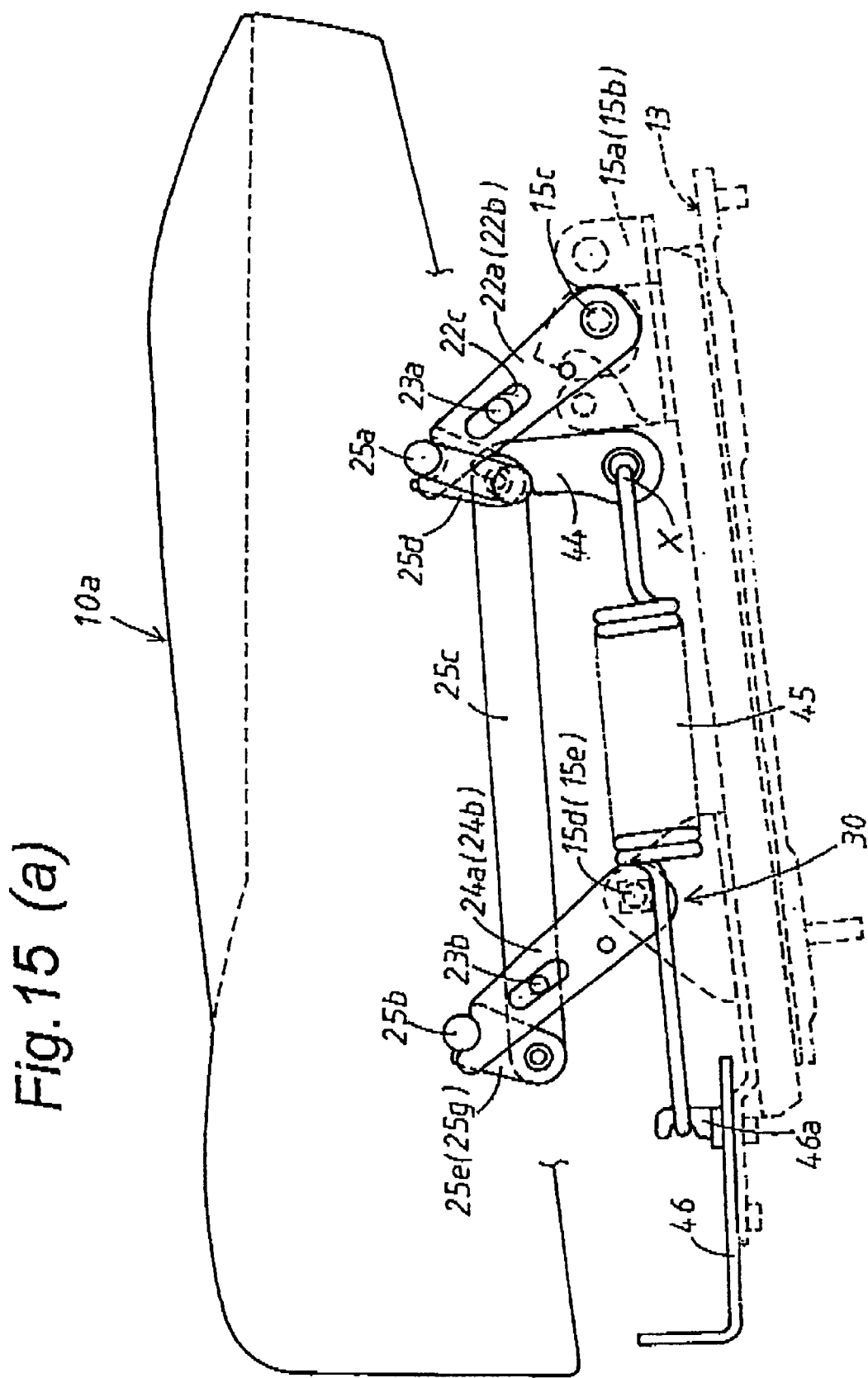
FIGS. 15(a) and 15(b) illustrate the mode of operation of the suspension mechanism shown in FIG. 12.
Figure 15:
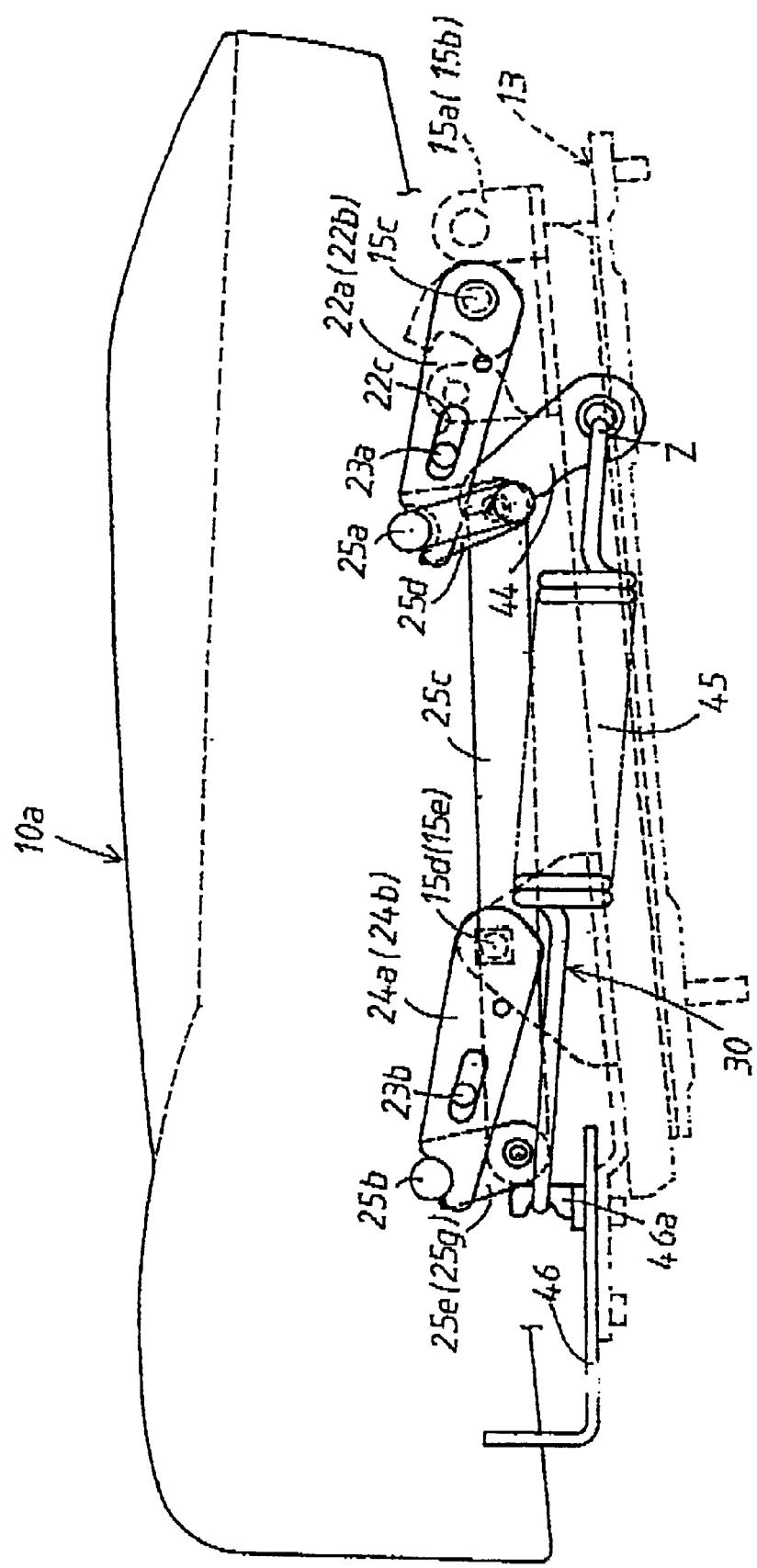

The support frame 10c of seat cushion 10a is in the form of a rectangular structure which is integrally provided at its rear end with a pair of upright brackets 12a and 12b to be assembled with a frame structure (not shown) of the backrest 10b. As shown in FIGS. 11 to 13, the pair of seat tracks 13 each are composed of a lower rail 13a mounted on a floor of a vehicle compartment in a fore-and-aft direction, an upper rail 13b slidably coupled with the lower rail 13a, and a pair of locking mechanisms 14 for locking the upper rails 13b to the lower rails 13a in a desired position. The upper rails 13b each are provided thereon with front and rear base brackets 15a, 18b and 15d. 15e, and a lateral base plate 48 is fixed to the front ends of upper rails 13b at its opposite ends. The locking mechanisms 14 mounted on the upper rails 13b are constructed to release the upper rails 13b from the lower rails 13b by operation of a release lever 14a shown by imaginary lines in FIG. 12. When the release lever 14a is operated to release the locking mechanism 14, the upper rails 13b can be moved along the lower fails 13a for adjustment of the seating position of the vehicle seat.

As shown in FIGS. 11 to 15, the suspension mechanism 20 includes a pair of rear link members 22a, 22b, a pair of torsion bar springs 23a, 23b, a pair of front link members 24a, 24b, a pair of connecting rods 25a, 25b, and a tension coil spring 45. The rear link members 22a, 22b are supported on the rear base brackets 15a, 15b at their rear ends respectively by means of a support pin 15c and pivotally movable in a vertical direction. The front link members 24a, 24b are supported on upright flanges of the front base brackets 15d, 15e at their rear ends respectively by means of a support pin 24c and pivotally movable in a vertical direction. The torsion bar springs 23a, 23b each are formed at their one ends with a hooked portion and bent in an L-shape at their other ends. The bent portions of torsion bar springs 23a, 23b are fixed to the rear base brackets 15a, 15b respectively, and the hooked portions of torsion bar springs 23a, 23b are engaged with each elongated hole 22c formed in the rear link members 22a, 22b. The torsion bar springs 23a, 23b are carried by clamps 21c fixed to the movable brackets 21a, 21b. The rear link members 22a, 22b are loaded upward by the torsion bar springs 23a, 23b engaged therewith.

The rear connecting rod 25a is engaged with the front ends of rear link members 22a, 22b for connecting the rear link members 22a, 22b to one another. The rear connecting rod 25a is connected at its opposite ends to the cushion frame 10c. The rotation extent of each of the rear link members 22a, 22b is restricted by engagement with upright flanges 15a1, 15b1 of the rear base brackets 15a, 15b. As shown in FIG. 13; the front link members 24a, 24b are connected at their front ends to one another by means of the front connecting rod 25b fixedly engaged therewith. The front connecting rod 25b is connected at its opposite ends to the cushion frame 10c and interconnected to the rear connecting rod 25b by means of a pair of connecting members 25c and each pair of connecting arms 25d, 25e.

As shown in FIG. 12, the tension coil spring 45 is engaged at its front end with a hook 46a fixed to the base plate 46 and at its rear end with a connecting arm 44 fixed to the rear connecting rod 25b. The biasing force of tension coil spring 45 is determined to be larger than that of torsion bar springs 23a, 23b. As shown in FIG. 11, the suspension mechanism 20 is provided with a shock absorber 26 which is connected at its front end with a support bracket 25g fixed to the front connecting rod 25b and at its rear end with a support bracket 25f fixed to the connecting member 25c.

As shown in FIGS. 11 to 14, the spring adjustment mechanism 30 includes a pair of operation arms 31a, 31b, an operation shaft 34, a movable member 33, a pair of swing arms 35a, 35b and a pair of operation wires 36a, 36b. The movable brackets 21a, 21b, operation arms 31a, 31b, swing arms 35a, 35b and operation wires 36a, 36b are located under the cushion frame 10c and arranged symmetrically with respect to the operation shaft 34. The movable brackets 21a, 21b each are rotatably supported on the rear base brackets 15a, 15b respectively by means of a support pin 15d to be pivotablly movable in a vertical direction. The operation arms 31a, 31b each are rotatably supported on upright flanges of the rear base brackets 15a, 15b respectively by means of a support pin 37a to be movable in the vertical direction and connected to the movable brackets 21a, 21b respectively by means of a connecting pin 37b. The connecting pin 37b is fixed to each movable end of operation arms 31a, 31b and is inserted into an elongated hole 21d respectively formed in the movable brackets 21a, 21b.

The operation shaft 34 is formed with a threaded portion 34b and provided with a handle 34a. The operation shaft 34 is rotatably supported on an upright flange of the base plate 46 and an upright bracket 46b fixed to the base plate 46 to be displaced forward or backward in the fore-and-aft direction of the vehicle seat, and the movable member 33 is mounted on the threaded portion 34b of operation shaft 34 to be moved forward or backward. As shown in FIG. 10, the operation shaft 34 is extended forward from the cushion frame 10c, and the handle 34a is fixed to the outer end of operation shaft 34. The swing arms 35a, 35b each are pivoted to the base plate 46 at their intermediate portions respectively by means of a support pin 37c and pivoted to the opposite ends of movable member 33 respectively by means of a connecting pin 37d. The operation wires 36a, 36b are connected to the outer ends of swing arms 35a, 35b at their front ends and the operation arms 31a, 31b at their rear ends. In the vehicle seat, the suspension mechanism 20 acts to enhance the seating comfort of the vehicle seat, and the resiliency of the suspension mechanism 20 can be adjusted by operation of the spring adjustment mechanism 30 to ensure the seating comfort of the vehicle seat in accordance with a difference in weight of a passenger.

When the seat cushion 10a is in an unloaded condition as shown in FIG. 15a, the rear link members 22a, 22b are retained in an upper position under the load of torsion bar springs 23a, 23b, while the front link members 24a, 24b are retained in an upper position to maintain the shock absorber 26 in a contracted condition. When a passenger seated on the seat cushion 10a, the torsion bar springs 23a, 23b of the suspension mechanism 20 are twisted by a load applied thereto from the seat cushion 10a, and the rear link members 22a, 22b and front link members 24a, 24b are rotated downward as shown in FIG. 15b. In such as instance, the shock absorber 25 is expanded by forward rotation of the connecting arms 25e and 25b to absorb impact and vibration caused by the load from the seat cushion 10a.

Figure 18:
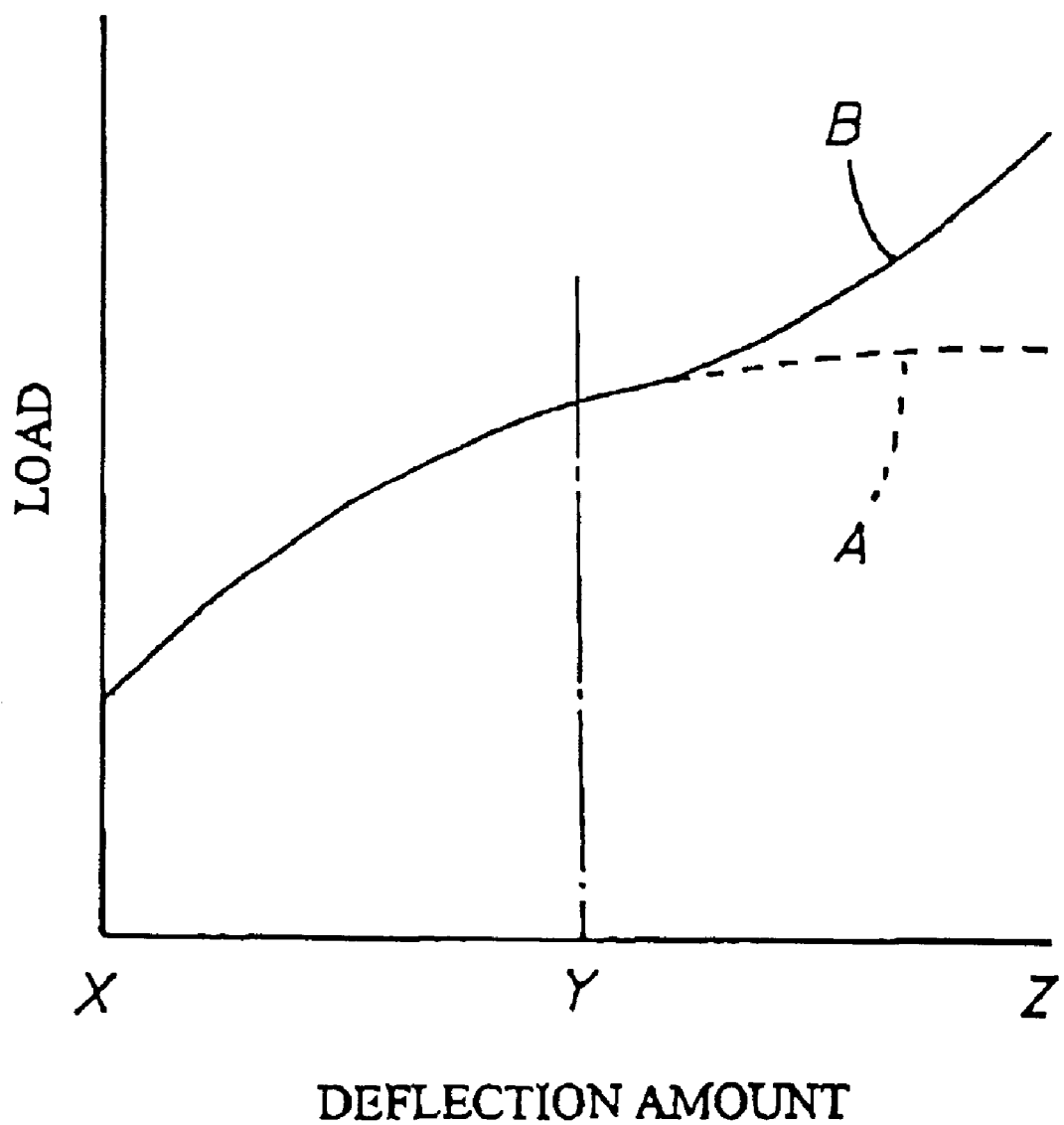
FIG. 18 is a graph showing a deflection amount of a suspension mechanism is relation to a load applied to a seat cushion.

When the load applied to the seat cushion 10a is less than a predetermined value, the connecting arm 44 is rotated in an extent between positions X and Y shown in FIG. 15(a). In such as instance, only the resilient force of torsion bar springs 23a, 23b is applied to the seat cushion 10a, and the deflection amount of torsion bar springs 23a, 23b is increased as shown by the solid curve B in FIG. 18. When the load applied to the seat cushion 10a is more than the predetermined value, the connecting arm 44 is rotated in an extent between positions Y and Z shown in FIG. 15(b). In such as instance, the seat cushion 10a is applied with the resilient forces of torsion bar springs 23a, 23b and tension coil spring 45, and the deflection amount of torsion bar springs 23a, 23b is increased by the solid curve B in FIG. 18.

As is understood from the above description, the seating comfort of the vehicle seat is enhanced by adjustment of the resilient force of torsion bar springs 23a, 23b. When the seat cushion 10a is applied with a heavy load, the tension spring 45 cooperates with the torsion bar springs 23a, 23b to resiliently support the seat cushion 10a thereby to enhance the seating comfort of the vehicle seat without causing a bottomed feel on the seat cushion.

Figure 16:
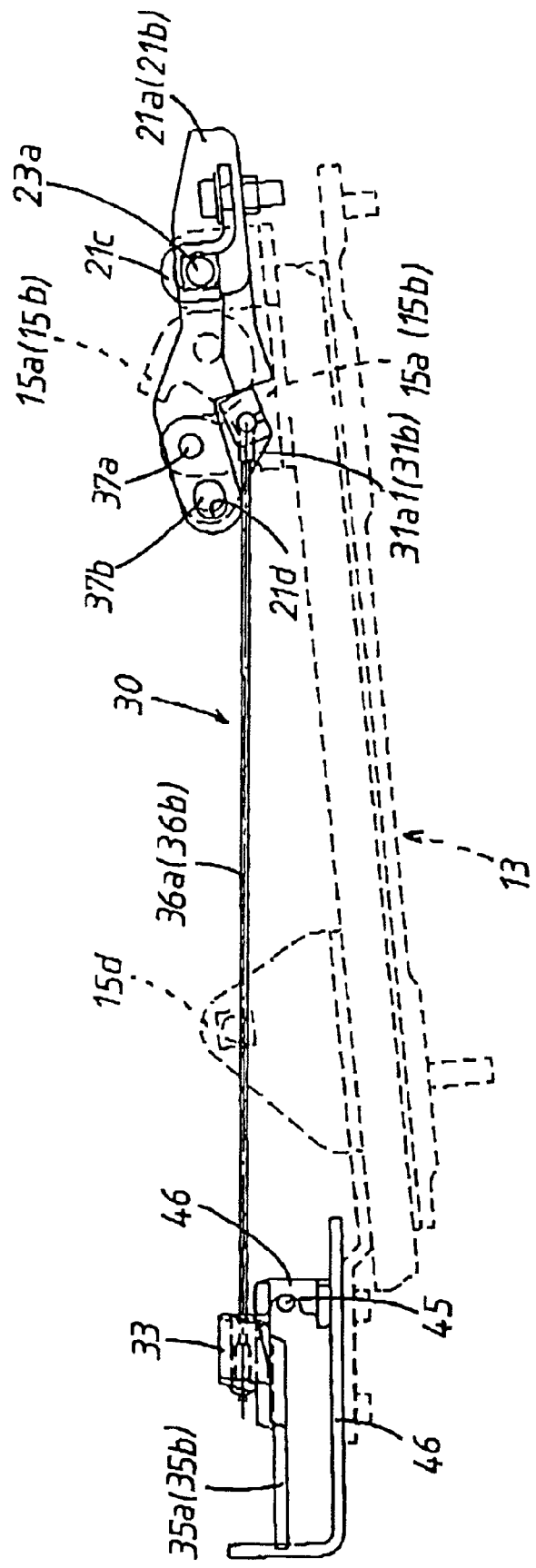
FIG. 16 is a side view of the spring adjustment mechanism shown in FIG. 14.
Figure 17:
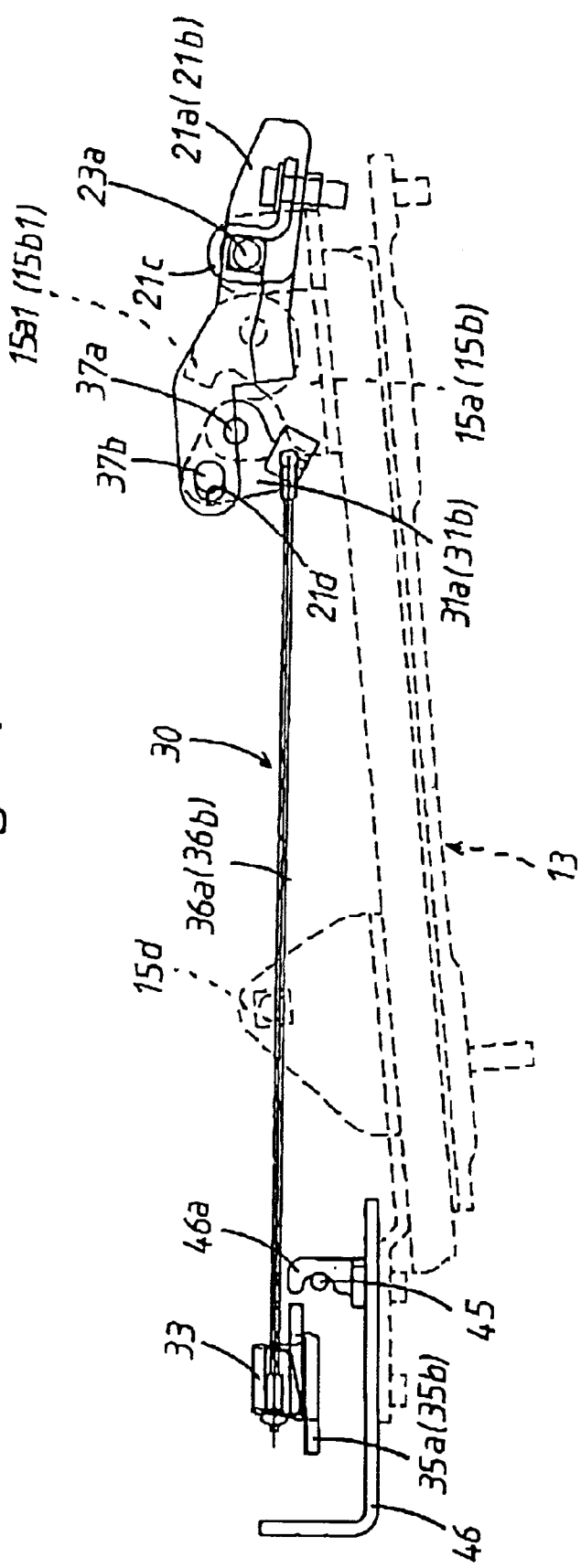
FIG. 17 is a side view of the spring adjustment mechanism, illustrated in a condition where the resilient force of the suspension mechanism has been increased.

In the vehicle seat, the resilient force of torsion springs 23a, 23b can be adjusted by operation of the handle 34a on the operation shaft 34. When the resilient force of torsion springs 23a, 23b is adjusted in a small amount, the spring adjustment mechanism 30 is maintained in a condition shown by solid lines in FIG. 14. In such a condition, the movable member 33 is positioned at a front end of the threaded portion 34b of operation shaft 34 so that the outer ends of swing arms 35a, 35b are moved rearward to retain the movable brackets 21a, 21b in a horizontal position as shown in FIG. 16. When the handle 34a is operated to rotate the operation shaft 34, the movable member 33 is retracted rearward to move the inner ends of swing arms 35a, 35b rearward about the support pins 37c as shown by imaginary lines in FIG. 14. Thus, the outer ends of swing arms 35a, 35b are moved forward so that the operation wires 36a, 36b are pulled by the swing arms 35a, 35b to rotate the movable brackets 21a, 21b upward about the support pins 15a, 15b as shown in FIG. 17. As a result, the movable brackets 21a, 21b are moved clockwisely by the operation arms 31a, 31b to raise the torsion bar springs 23a, 23b at their clamped portions. In such an instance, the resilient force of torsion bar springs 23a, 23b applied to the seat cushion 10a is increased in accordance with the raised amount of torsion bar springs 23a, 23b.

What is claimed is:

1. A vehicle seat provided with a seat cushion having a support frame supported by a suspension mechanism, wherein said suspension mechanism includes a torsion bar spring loaded to resiliently support the support frame of the seat cushion, and wherein a spring adjustment mechanism is assembled with said suspension mechanism for adjusting the resilient force of said torsion bar spring, wherein said spring adjustment mechanism includes a movable bracket pivotally mounted on a support structure placed on a floor of a vehicle compartment for the pivoting of said movable bracket in a vertical direction, an adjustment mechanism for adjusting an amount of vertical pivoting of said movable bracket, an operation arm pivotally mounted on said support structure or the pivoting of said movable bracket in a vertical direction and being connected with said movable bracket to cause vertical pivoting of said movable bracket when moved in the vertical direction, an operation shaft supported from the support frame of the seat cushion to be rotated by operation of a handle fixed thereto, a movable member mounted on said operation shaft to be moved forward or backward by rotation of said operation shaft, a swing arm pivoted at an intermediate portion thereof to the support frame of the seat cushion and pivotally connected at one end thereof to said movable member, and an operation wire connected at one end thereof to the other end of said swing arm and at the other end thereof to said operation arm and wherein the torsion bar spring of said suspension mechanism is supported at one end thereof on the support structure and carried by said movable bracket at the other end thereof to resilient support the support frame of the seat cushion.

2. A vehicle seat as claimed in claim 1, wherein said suspension mechanism further includes a tension spring assembled therewith to cooperate with said torsion bar spring in such a manner as to resilient support the support frame of the seat cushion when the support frame is applied with a load more than a predetermined value.

* * * * *